US012228869B2

(12) United States Patent
Ono et al.

(10) Patent No.: US 12,228,869 B2
(45) Date of Patent: Feb. 18, 2025

(54) TRANSFER DEVICE AND IMAGE FORMING APPARATUS

(71) Applicant: FUJIFILM Business Innovation Corp., Tokyo (JP)

(72) Inventors: Masato Ono, Ebina (JP); Shigeru Fukuda, Ebina (JP); Satoya Sugiura, Ebina (JP); Hiroaki Tanaka, Ebina (JP); Yosuke Kubo, Ebina (JP); Iori Nishimura, Ebina (JP); Daisuke Tanemura, Ebina (JP); Masayuki Seko, Ebina (JP); Koichi Matsumoto, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/362,547

(22) Filed: Jul. 31, 2023

(65) Prior Publication Data

US 2024/0295841 A1 Sep. 5, 2024

(30) Foreign Application Priority Data

Feb. 20, 2023 (JP) ................................ 2023-024589

(51) Int. Cl.
*G03G 15/16* (2006.01)
*G03G 15/00* (2006.01)

(52) U.S. Cl.
CPC ....... *G03G 15/162* (2013.01); *G03G 15/5041* (2013.01); *G03G 2215/00059* (2013.01)

(58) Field of Classification Search
CPC ............. G03G 15/162; G03G 15/5041; G03G 2215/00059
See application file for complete search history.

(56) References Cited

U.S. PATENT DOCUMENTS

2010/0196062 A1* 8/2010 Kozasa ................ G03G 15/162 399/302
2019/0302656 A1* 10/2019 Ishizumi .............. G03G 15/162
2020/0285173 A1* 9/2020 Ohmori ................ G03G 15/162

FOREIGN PATENT DOCUMENTS

JP 2011-039430 A 2/2011
JP 2011-242724 A 12/2011
JP 6307899 B2 4/2018

* cited by examiner

*Primary Examiner* — Sophia S Chen
(74) *Attorney, Agent, or Firm* — Sughrue Mion, PLLC

(57) ABSTRACT

A transfer device includes an intermediate transfer belt having a surface to which a toner image may be transferred and solid lubricant particles are attached, a primary transfer member performing primary transfer of a toner image to the surface of the intermediate transfer belt, a secondary transfer member performing secondary transfer of the toner image to a surface of a recording medium, and a detection device detecting a density of the toner image and has a light irradiation unit irradiating the surface of the intermediate transfer belt and a light receiving unit receiving reflected light, in which a relationship between a volume-average particle size A (nm) of the solid lubricant particles attached to the surface of the intermediate transfer belt and a wavelength B (nm) of the light radiated from the light irradiation unit satisfies the following Expression:

Expression 1: $B > A \times 8.6 + 300$.

16 Claims, 2 Drawing Sheets

TRANSFER DEVICE AND IMAGE FORMING APPARATUS

CROSS-REFERENCE TO RELATED APPLICATIONS

This application is based on and claims priority under 35 USC 119 from Japanese Patent Application No. 2023-024589 filed Feb. 20, 2023.

BACKGROUND

(i) Technical Field

The present invention relates to a transfer device and an image forming apparatus.

(ii) Related Art

In an image forming apparatus (such as a copy machine, a facsimile machine, or a printer) using an electrophotographic method, a toner image formed on the surface of an image holder is transferred to the surface of a recording medium and fixed on the recording medium such that an image is formed. For the transfer of the toner image to the recording medium, for example, an intermediate transfer belt is used.

For example, JP2011-242724A discloses "a transfer device having an elastic transfer belt that includes a base layer containing a polyimide resin or a polyamide-imide resin and an elastic layer laminated on the base layer, in which spherical particles with an average particle size of 0.5 to 4 μm having a refractive index higher than a refractive index of the elastic layer at a wavelength of 900 nm are spread on the elastic layer".

JP2011-039430A discloses "a transfer device having an intermediate transfer belt that is used in an electrophotographic image forming apparatus and has a substrate layer and a surface layer, in which the surface layer consists of a coat layer formed of a material containing at least a binder resin and inorganic fine particles having a volume-average particle size of 30 nm to 200 nm, and the inorganic fine particles are unevenly distributed and fixed on a surface of the coat layer".

SUMMARY

Aspects of non-limiting embodiments of the present disclosure relate to a transfer device and an image forming apparatus that includes an intermediate transfer belt which has a surface to which a toner image is to be transferred, a primary transfer device which has a primary transfer member performing primary transfer of a toner image formed on a surface of an image holder to the surface of the intermediate transfer belt, a secondary transfer device which has a secondary transfer member arranged in contact with the surface of the intermediate transfer belt and performing secondary transfer of the toner image transferred to the surface of the intermediate transfer belt to a surface of a recording medium, and a detection device which detects a density of the toner image transferred to the surface of the intermediate transfer belt and has a light irradiation unit irradiating the surface of the intermediate transfer belt with light and a light receiving unit receiving reflected light generated in a case where the light radiated from the light irradiation unit is reflected from the surface of the intermediate transfer belt, the transfer device making it possible to more effectively obtain an image having a target image density compared to a transfer device that does not satisfy Expression 1: B>A×8.6+300.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for addressing the above problems include the following aspect.

According to an aspect of the present disclosure, there is provided a transfer device including an intermediate transfer belt that has a surface to which a toner image is to be transferred and solid lubricant particles are attached,

- a primary transfer device that has a primary transfer member performing primary transfer of a toner image formed on a surface of an image holder to the surface of the intermediate transfer belt,
- a secondary transfer device that has a secondary transfer member which is arranged in contact with the surface of the intermediate transfer belt and performs secondary transfer of the toner image transferred to the surface of the intermediate transfer belt to a surface of a recording medium, and
- a detection device that detects a density of the toner image transferred to the surface of the intermediate transfer belt and has a light irradiation unit irradiating the surface of the intermediate transfer belt with light and a light receiving unit receiving reflected light generated in a case where the light radiated from the light irradiation unit is reflected from the surface of the intermediate transfer belt,
- in which a relationship between a volume-average particle size A (nm) of the solid lubricant particles attached to the surface of the intermediate transfer belt and a wavelength B (nm) of the light radiated from the light irradiation unit satisfies the following Expression 1.

$$B > A \times 8.6 + 300 \quad \text{Expression 1}$$

BRIEF DESCRIPTION OF THE DRAWINGS

Exemplary embodiment(s) of the present invention will be described in detail based on the following figures, wherein.

DETAILED DESCRIPTION

Figure 1:
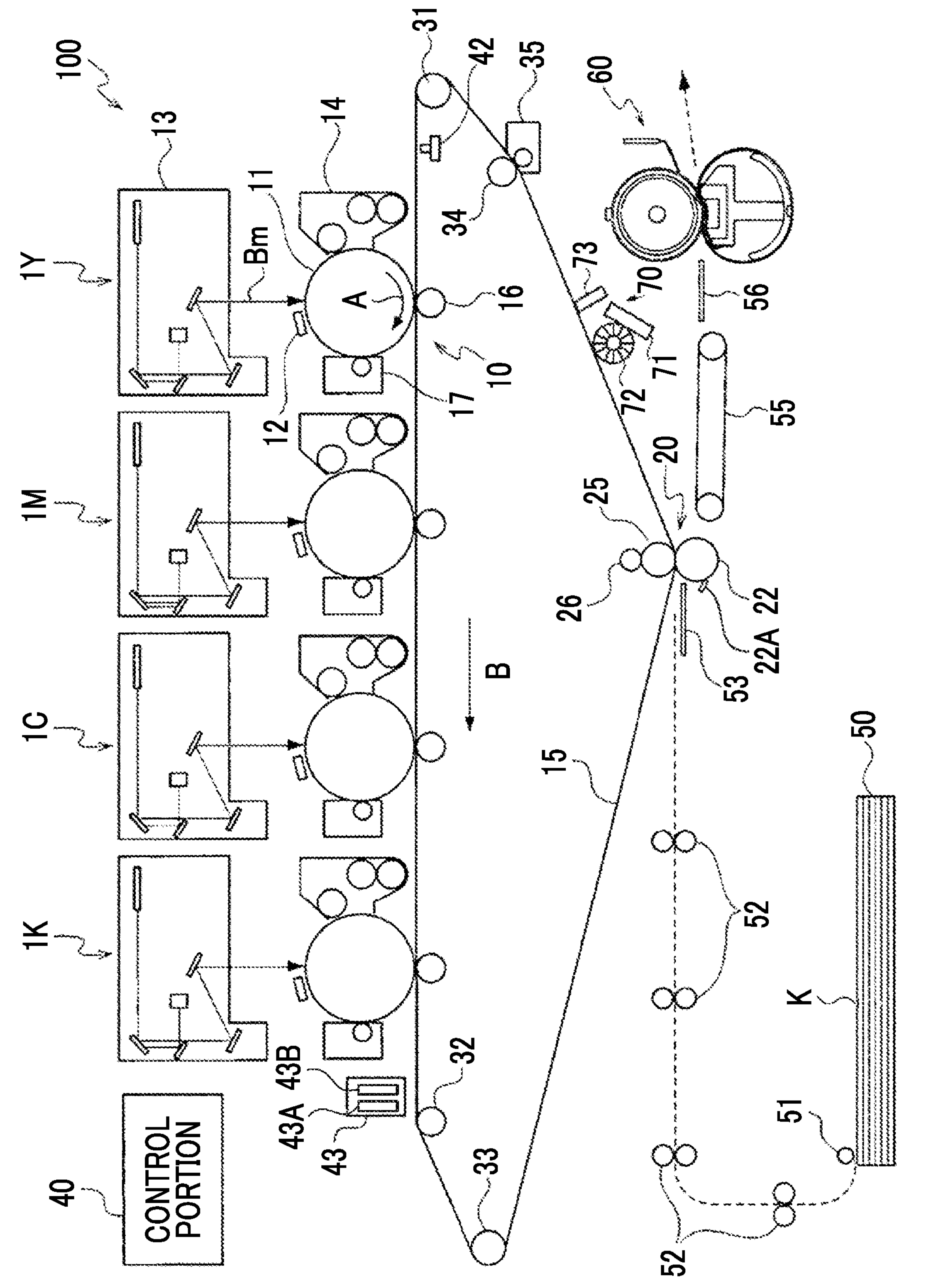
FIG. 1 is a schematic configuration view showing an example of an image forming apparatus according to the present exemplary embodiment.

Hereinafter, the present exemplary embodiment as an example of the present invention will be described. The following descriptions and examples merely illustrate exemplary embodiments, and do not limit the scope of the exemplary embodiments.

Regarding the ranges of numerical values described in stages in the present exemplary embodiment, the upper limit or lower limit of a range of numerical values may be replaced with the upper limit or lower limit of another range of numerical values described in stages. Furthermore, in the present exemplary embodiment, the upper limit or lower limit of a range of numerical values may be replaced with values described in examples.

In the present exemplary embodiment, the term "step" includes not only an independent step but a step which is not clearly distinguished from other steps as long as the intended goal of the step is achieved.

In the present exemplary embodiment, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present exemplary embodiment, each component may include a plurality of corresponding substances. In a case where the amount of each component in a composition is mentioned in the present exemplary embodiment, and there are two or more kinds of substances corresponding to each component in the composition, unless otherwise specified, the amount of each component means the total amount of two or more kinds of the substances present in the composition.

Transfer Device/Image Forming Apparatus

The transfer device according to the present exemplary embodiment includes

- an intermediate transfer belt that has a surface to which a toner image is to be transferred,
- a primary transfer device that has a primary transfer member performing primary transfer of a toner image formed on a surface of an image holder to the surface of the intermediate transfer belt,
- a secondary transfer device that has a secondary transfer member which is arranged in contact with the surface of the intermediate transfer belt and performs secondary transfer of the toner image transferred to the surface of the intermediate transfer belt to a surface of a recording medium, and
- a detection device that detects a density of the toner image transferred to the surface of the intermediate transfer belt and has a light irradiation unit irradiating the surface of the intermediate transfer belt with light and a light receiving unit receiving reflected light generated in a case where the light radiated from the light irradiation unit is reflected from the surface of the intermediate transfer belt.

In the transfer device according to the present exemplary embodiment, a relationship between a volume-average particle size A (nm) of the solid lubricant particles attached to the surface of the intermediate transfer belt and a wavelength B (nm) of the light radiated from the light irradiation unit satisfies the following Expression 1.

$$B > A \times 8.6 + 300 \qquad \text{Expression 1}$$

Furthermore, the image forming apparatus according to the present exemplary embodiment includes

- a toner image forming device that has an image holder and forms a toner image on a surface of the image holder, and
- the transfer device according to the present exemplary embodiment that is a transfer device transferring the toner image formed on the surface of the image holder to a surface of a recording medium.

Having the above configuration, the transfer device and the image forming apparatus according to the present exemplary embodiment produce an image having a target image density.

In the field of electrophotographic apparatus, the sustainability of toner image transfer to paper having roughness (that is, a recording medium having surface roughness, such as embossed paper, which will be also simply called "embossed paper" hereinafter) deteriorates. While images are being repeatedly formed, the discharge products generated from an image holder or the like are deposited on the surface of the intermediate transfer belt, which gradually increases the adhesion between the intermediate transfer belt and a toner and causes the deterioration of sustainability of toner transfer.

In this regard, in a case where solid lubricant particles are attached to the surface of the intermediate transfer belt, an increase in the adhesion between the intermediate transfer belt and the toner is suppressed, and the transferability of the toner is sustained.

Incidentally, a transfer device is known which includes a detection device that detects a density of the toner image transferred to the surface of the intermediate transfer belt and has a light irradiation unit irradiating the surface of the intermediate transfer belt with light and a light receiving unit receiving reflected light generated in a case where the light radiated from the light irradiation unit is reflected from the surface of the intermediate transfer belt (hereinafter, also called "specific transfer device"). In the specific transfer device, the detection device detects the density of the toner image transferred to the surface of the intermediate transfer belt. Accordingly, the image forming apparatus (a developing device thereof or the like) is controlled such that the target density of the toner image (that is, the image density) is achieved according to the detected density of the toner image (that is, the image density).

However, in a case where the solid lubricant particles are attached to the surface of the intermediate transfer belt in the specific transfer device, sometimes the detection device fails to accurately detect the density of the toner image.

In a case where the surface of the intermediate transfer belt is irradiated with light from the light irradiation unit, a phenomenon occurs where a part of the radiated light is trapped in the particle layer of the solid lubricant particles. This phenomenon is considered to occur because the moth-eye structure of the particle layer brings about "light trapping effect". As a result, the reflectance of the reflected light reflected from the surface of the intermediate transfer belt and from the toner image is reduced. Therefore, the light receiving unit fails to accurately receives the reflected light, and the density of the toner image that the received reflected light has is different from the target density of the toner image, which makes it difficult to obtain an image with a target image density.

On the other hand, in a case where the relationship between the volume-average particle size A (nm) of the solid lubricant particles attached to the surface of the intermediate transfer belt and the wavelength B (nm) of the light radiated from the light irradiation unit is made satisfy the following Expression 1, the phenomenon where a part of the light radiated to the surface of the intermediate transfer belt from the light irradiation unit is trapped in the particle layer of the solid lubricant particles is unlikely to occur. Presumably, in a case where the following Expression 1 is satisfied, the wavelength B of the light may be on the long-wavelength side and the solid lubricant particles may be on a small-diameter side, which may prevent the moth-eye structure of the particle layer from bringing about "light trapping effect" and suppress the occurrence of the aforementioned phenomenon.

As described above, presumably, having the above configuration, the transfer device and the image forming apparatus according to the present exemplary embodiment may produce an image having a target image density.

Hereinafter, the transfer device according to the present exemplary embodiment will be specifically described.

Relationship of Expression 1

In the transfer device according to the present exemplary embodiment, a relationship between a volume-average particle size A (nm) of the solid lubricant particles attached to the surface of the intermediate transfer belt and a wavelength B (nm) of the light radiated from the light irradiation unit satisfies the following Expression 1. From the viewpoint of obtaining an image having a target image density, for example, it is preferable that the volume-average particle size A and the wavelength B satisfy the following Expression 2.

In a case where the wavelength B of the light is larger than the value of "volume-average particle size A of solid lubricant particles×8.6+300", the light receiving unit of the detection device can more accurately receive reflected light, and an image having a target image density is obtained.

$$B > A\times 8.6+300 \quad \text{Expression 1}$$

$$B > A\times 8.6+400 \quad \text{Expression 2}$$

In order that the relationship between the volume-average particle size A (nm) of the solid lubricant particles attached to the surface of the intermediate transfer belt and the wavelength B (nm) of the light radiated from the light irradiation unit satisfies the following Expression 1 (for example, preferably Expression 2), and that an image having a target image density is obtained, for example, the transfer device may be configured to satisfy the following conditions.

The coverage of the surface of the intermediate transfer belt by the solid lubricant particles is, for example, 25% or more and 90% or less (for example, preferably 30% or more and 80% or less).

The coverage by the solid lubricant particles is measured by the following method.

The surface of a sample of the intermediate transfer belt to which the solid lubricant particles are attached (that is, the surface to which the particles are attached) is observed with a scanning electronmicroscope (SEM) in an observation field of view of 5 μm×5 μm at 25,000× magnification.

Then, from the observation image, the area of the observation field of view and the area of the solid lubricant particles are determined, and the area ratio of the solid lubricant particles is calculated by Equation: Area ratio of solid lubricant particles=area of solid lubricant particles/area of observation field of view×100.

The above operation is performed 5 times on the surfaces of different samples, and the arithmetic mean of the obtained area ratios is defined as "coverage by solid lubricant particles".

The volume-average particle size A (nm) of the solid lubricant particles is, for example, 25 nm or more and 200 nm or less (for example, preferably 30 nm or more and 120 nm or less).

The volume-average particle size A of the solid lubricant particles is measured by the following method.

The surface of a sample of the intermediate transfer belt to which the solid lubricant particles are attached (that is, the surface to which the particles are attached) is observed with a scanning electron microscope in an observation field of view of 5 μm×5 μm at 25,000× magnification.

Then, from the observation image, the area of the solid lubricant particles is measured, and an equivalent circle diameter (=2√(area/π)) is calculated from the obtained area. This equivalent circle diameter is calculated for 50 solid lubricant particles.

The above operation is performed 5 times on the surfaces of different samples, and 50% diameter (D50) in a volume-based cumulative frequency of the equivalent circle diameter of 250 solid lubricant particles is defined as the volume-average particle size of the solid lubricant particles.

The wavelength B (nm) of the light radiated from the light irradiation unit is, for example, 600 nm or more and 2,000 nm or less.

The incident angle of the light radiated from the light irradiation unit with respect to the surface of the intermediate transfer belt (that is, the sharp angle formed between the light radiation direction and the surface of the intermediate transfer belt) is, for example, 15° or more and 60° or less.

The refractive index of the solid lubricant particles is, for example, 1.2 or more and 2.5 or less (for example, preferably 1.4 or more and 2.0 or less).

The refractive index of the solid lubricant particles is measured according to JIS K7142: 2014.

The volume-based particle size distribution index GSDv of the solid lubricant particles is, for example, 3.5 or less.

The volume-based particle size distribution index GSDv of the solid lubricant particles is measured as follows.

The equivalent circle diameter of 250 solid lubricant particles is measured by the same method as the method of measuring the volume-average particle size of the solid lubricant particles, a cumulative distribution of the equivalent circle diameter is drawn from small diameter side based on volume, a particle size at which the cumulative volume of particles smaller than the particle size is 16% is defined as a number-average particle size D16v, and a particle size at which the cumulative volume of particles smaller than the particle size is 84% is defined as number-average particle size D84v. The volume-based particle size distribution index GSDv is calculated by Equation: $GSDv=(D84v/D16v)^{1/2}$.

Solid Lubricant Particles

The solid lubricant particles are attached to the surface (that is, the outer peripheral surface) of the intermediate transfer belt.

Examples of the solid lubricant particles include metal oxide particles, fatty acid metal salt particles, and the like.

Among these, from the viewpoint of improving transfer sustainability of the intermediate transfer belt and obtaining an image having a target image density, for example, metal oxide particles are preferable as the solid lubricant particles. Particularly, for example, the metal oxide particles are also preferable from the viewpoint of satisfying the refractive index of the solid lubricant particles.

Examples of the metal oxide particles include silica particles ($SiO_2$), titania particles ($TiO_2$), alumina particles ($Al_2O_3$), cerium oxide particles, magnesium oxide particles, zinc oxide particles, and zirconia particles ($ZrO_2$), strontium titanate ($SrTiO_3$), barium titanate ($BaTiO_3$), and the like.

Among these, from the viewpoint of improving transfer sustainability of the intermediate transfer belt and obtaining an image having a target image density, for example, silica particles are preferable as the metal oxide particles. Particularly, for example, silica particles are also preferable from the viewpoint of satisfying the refractive index of the solid lubricant particles.

Using silica particles as the metal oxide particles further improves the ability (that is, polishing ability) to scrape off deposits (for example, discharge products) in a case where the silica particles are deposited on a contact portion between the intermediate transfer belt and a cleaning blade and form "particle clustering (so-called particle dam)". As a result, the transfer sustainability of the intermediate transfer belt is improved.

The solid lubricant particles are, for example, preferably particles that have undergone a hydrophobic treatment.

Using the solid lubricant particles with surfaces having undergone a hydrophobic treatment reduces the adhesion between the toner and the solid lubricant particles and improves the transfer sustainability of the intermediate transfer belt.

Examples of the hydrophobic treatment agent used for the hydrophobic treatment on the surface include known organosilicon compounds having an alkyl group (for example, a methyl group, an ethyl group, a propyl group, a butyl group, or the like). Specifically, examples thereof include a silazane compound (for example, a silane compound such as methyltrimethoxysilane, dimethyldimethoxysilane, trimethylchlorosilane, trimethylmethoxysilane, or octyltriethoxysilane, hexamethyldisilazane, tetramethyldisilazane, or the like), and the like. One hydrophobic treatment agent may be used alone, or two or more hydrophobic treatment agents may be used in combination.

The aspect ratio of the solid lubricant particles is, for example, preferably 1 or more and 1.8 or less. That is, for example, it is preferable that the shape of the solid lubricant particles be close to a spherical shape.

In a case where the aspect ratio is 1.8 or less, appropriate voids are formed between the toner and the intermediate transfer belt by the interposed solid lubricant particles, and transfer sustainability of the intermediate transfer belt is improved.

From the viewpoint of improving transfer sustainability of the intermediate transfer belt, the aspect ratio is, for example, more preferably 1 or more and 1.4 or less.

The aspect ratio of the solid lubricant particles means a ratio of a major axis length to a minor axis length (major axis length/minor axis length). The major axis length of the solid lubricant particles means the maximum length of the solid lubricant particles. The minor axis length of the solid lubricant particles means the length of the longest axis among the axes in a direction orthogonal to an extension of the major axis of the solid lubricant particles.

By the same method as the method of measuring the volume-average particle size of the solid lubricant particles, 250 solid lubricant particles are observed, and the average of the obtained aspect ratios is adopted as the aspect ratio of the solid lubricant particles.

Intermediate Transfer Belt

The solid lubricant particles are attached to the surface (that is, the outer peripheral surface) of the intermediate transfer belt.

The intermediate transfer belt may be a single layer of a resin substrate layer, or may be a laminate including a resin substrate layer.

Examples of the laminate including a resin substrate layer include a laminate in which an elastic layer is provided on the outer peripheral surface of a resin substrate layer, a laminate in which a resin layer is provided on the inner peripheral surface of a resin substrate layer, and a laminate in which an elastic layer and a resin layer are provided on the outer peripheral surface of a resin substrate layer and on the inner peripheral surface of the resin substrate layer respectively.

As the elastic layer provided on the outer peripheral surface of a resin substrate layer and the resin layer provided on the inner peripheral surface of the resin substrate layer, known layers adopted for the intermediate transfer belt are used.

Resin Substrate Layer

The resin substrate layer contains, for example, a resin and a conducting agent. As necessary, the resin substrate layer may contain other known components.

Resin

Examples of the resin include a polyimide resin (PI resin), a polyamide-imide resin (PAI resin), an aromatic polyether ketone resin (for example, an aromatic polyether ether ketone resin or the like), a polyphenylene sulfide resin (PPS resin), and a polyetherimide resin (PEI resin), a polyester resin, a polyamide resin, a polycarbonate resin, and the like.

From the viewpoint of mechanical strength and dispersibility of the conducting agent, the resin is, for example, preferably a polyimide-based resin (that is, a resin containing a constitutional unit having an imide bond), more preferably a polyimide resin or a polyamideimide resin, and even more preferably a polyimide resin.

Examples of the polyimide resin include an imidized polyamic acid (polyimide resin precursor) which is a polymer of a tetracarboxylic acid dianhydride and a diamine compound.

Examples of the polyimide resin include a resin having a constitutional unit represented by General Formula (I).

General Formula (I)

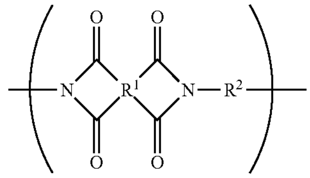

In General Formula (I), $R^1$ represents a tetravalent organic group, and $R^2$ represents a divalent organic group.

Examples of the tetravalent organic group represented by $R^1$ include an aromatic group, an aliphatic group, a cyclic aliphatic group, a group obtained by combining an aromatic group and an aliphatic group, and a group obtained by the substitution of these. Specific examples of the tetravalent organic group include a residue of a tetracarboxylic acid dianhydride which will be described later.

Examples of the divalent organic group represented by $R^2$ include an aromatic group, an aliphatic group, a cyclic aliphatic group, a group obtained by combining an aromatic group and an aliphatic group, and a group obtained by the substitution of these. Specific examples of the divalent organic group include a residue of a diamine compound which will be described later.

Specifically, examples of the tetracarboxylic acid dianhydride used as a raw material of the polyimide resin include a pyromellitic acid dianhydride, a 3,3',4,4'-benzophenone tetracarboxylic acid dianhydride, a 3,3',4,4'-biphenyltetracarboxylic acid dianhydride, a 2,3,3',4-biphenyltetracarboxylic acid dianhydride, a 2,3,6,7-naphthalenetetracarboxylic acid dianhydride, a 1,2,5,6-naphthalenetetracarboxylic acid dianhydride, a 1,4,5,8-naphthalenetetracarboxylic acid dianhydride, a 2,2'-bis(3,4-dicarboxyphenyl)sulfonic acid dianhydride, a perylene-3,4,9,10-Tetracarboxylic acid dianhydride, a bis(3,4-dicarboxyphenyl)ether dianhydride, and an ethylenetetracarboxylic acid dianhydride.

Specific examples of the diamine compound used as a raw material of the polyimide resin include 4,4'-diaminodiphenyl ether, 4,4'-diaminodiphenylmethane, 3,3'-diaminodiphenylmethane, 3,3'-dichlorobenzidine, 4,4'-diaminodiphenylsulfide, 3,3'-diaminodiphenylsulfone, 1,5-diaminonaphthalene, m-phenylenediamine, p-phenylenediamine, 3,3'-dimethyl 4,4'-biphenyldiamine, benzidine, 3,3'-dimethylbenzidine, 3,3'-dimethoxybenzidine, 4,4'-diaminodiphenylsulfone, 4,4'-diaminodiphenylpropane, 2,4-bis(β-amino tert-butyl)toluene, bis(p-β-amino-tert-butylphenyl)ether, bis(p-β-methyl-8-aminophenyl) benzene, bis-p-(1,1-dimethyl-5-amino-pentyl) benzene, 1-isopropyl-2,4-m-phenylenediamine, m-xylylene diamine, p-xylylene diamine, di(p-aminocyclohexyl)methane, hexamethylenediamine, heptamethylenediamine, octamethylenediamine, nonamethylenediamine, decamethylenediamine, diaminopropyltetramethylene, 3-methylheptamethylenediamine, 4,4-dimethylheptamethylenediamine, 2,11-diaminododecane, 1,2-bis-3-aminopropoxyethane, 2,2-dimethylpropylenediamine, 3-methoxyhexamethylenediamine, 2,5-dimethylheptamethylenediamine, 3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis[4-(4-aminophenoxy)phenyl]propane, piperazine, $H_2N(CH_2)_3O(CH_2)_2O(CH_2)NH_2$, $H_2N(CH_2)_3S(CH_2)_3NH_2$, $H_2N(CH_2)_3N(CH_3)_2(CH_2)_3NH_2$, and the like.

Examples of the polyamide-imide resin include a resin having an imide bond and an amide bond in a repeating unit.

More specifically, examples of the polyamide-imide resin include a polymer of a trivalent carboxylic acid compound (also called a tricarboxylic acid) having an acid anhydride group and a diisocyanate compound or a diamine compound.

As the tricarboxylic acid, for example, a trimellitic acid anhydride and a derivative thereof preferable. In addition to the tricarboxylic acid, a tetracarboxylic acid dianhydride, an aliphatic dicarboxylic acid, an aromatic dicarboxylic acid, or the like may also be used.

Examples of the diisocyanate compound include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, naphthalene-1,5-diisocyanate, and naphthalene-2,6-diisocyanate.

Examples of the diamine compound include a compound that has the same structure as the aforementioned isocyanate and has an amino group instead of an isocyanato group.

From the viewpoint of mechanical strength, volume resistivity adjustment, and the like, the content of the resin with respect to the resin substrate layer is, for example, preferably 60% by mass or more and 95% by mass or less, more preferably 70% by mass or more and 95% by mass or less, and even more preferably 75% by mass or more and 90% by mass or less.

Conducting Agent

Examples of the conducting agent include conductive particles (for example, particles having a volume resistivity less than $10^7$ Ω·cm, the same applies hereinafter) and semiconductive particles (for example, particles having a volume resistivity of $10^7$ Ω·cm or more and $10^{13}$ Ω·cm or less, the same applies hereinafter).

Specifically, the conducting agent is not particularly limited, and examples thereof include carbon black, a metal (for example, aluminum, nickel, or the like), a metal oxide (for example, yttrium oxide, tin oxide, or the like), an ion conducting substance (for example, potassium titanate, LiCl, or the like), and the like.

The conducting agent is selected depending on the intended use thereof. For example, carbon black is preferable.

Examples of the carbon black include Ketjen black, oil furnace black, channel black, and acetylene black. As the carbon black, carbon black having undergone a surface treatment (hereinafter, also called "surface-treated carbon black") may be used.

The surface-treated carbon black is obtained by adding, for example, a carboxy group, a quinone group, a lactone group, or a hydroxy group to the surface of carbon black. Examples of the surface treatment method include an air oxidation method of reacting carbon black by bringing the carbon black into contact with air in a high temperature atmosphere, a method of reacting carbon black with nitrogen oxide or ozone at room temperature (for example, 22° C.), and a method of oxidizing carbon black with air in a high temperature atmosphere and then with ozone at a low temperature.

From the viewpoint of dispersibility, mechanical strength, volume resistivity, film forming properties, and the like, the average particle size of the carbon black is, for example, preferably 2 nm or more and 40 nm or less, more preferably 8 nm or more and 20 nm or less, and even more preferably 10 nm or more and 15 nm or less.

The average particle size of the conducting agent (particularly carbon black) is measured by the following method.

First, by a microtome, a measurement sample having a thickness of 100 nm is collected from the resin substrate layer and observed with a transmission electron microscope (TEM). Then, the diameters of circles each having an area equivalent to the projected area of each of 50 conducting agents (that is, equivalent circle diameters) are adopted as particle sizes, and the average thereof are adopted as the average particle size.

From the viewpoint of mechanical strength, volume resistivity, and the like, the content of the conducting agent with respect to the resin substrate layer is, for example, preferably 10% by mass or more and 50% by mass or less, more preferably 12% by mass or more and 40% by mass or less, and even more preferably 15% by mass or more and 30% by mass or less.

Other Components

Examples of other components include a filler for improving mechanical strength, an antioxidant for preventing thermal deterioration of a belt, a surfactant for improving fluidity, a heat-resistant antioxidant, and the like.

In a case where the substrate layer contains other components, the content of the other components with respect to the resin substrate layer is, for example, preferably more than 0% by mass and 10% by mass or less, more preferably more than 0% by mass and 5% by mass or less, and even more preferably more than 0% by mass and 1% by mass or less.

Thickness of Resin Substrate Layer

From the viewpoint of mechanical strength, the thickness of the resin substrate layer is, for example, preferably 60 μm or more and 120 μm or less, and more preferably 80 μm or more and 120 μm or less.

The thickness of the resin substrate layer is measured as follows.

That is, a cross section of the resin substrate layer taken along the thickness direction is observed with an optical microscope or a scanning electron microscope, the thickness of the layer as a measurement target is measured at 10 sites, and the average thereof is adopted as the thickness.

Volume Resistivity of Intermediate Transfer Belt

From the viewpoint of transferability, the common logarithm of the volume resistivity that the intermediate transfer belt has in a case where a voltage of 500 V is applied thereto for 10 seconds is, for example, 9.0 (log Ω·cm) or more and 13.5 (log Ω·cm) or less, more preferably 9.5 (log Ω·cm) or more and 13.2 (log Ω·cm) or less, and particularly preferably 10.0 (log Ω·cm) or more and 12.5 (log Ω·cm) or less.

The volume resistivity that the intermediate transfer belt has in a case where a voltage of 500 V is applied thereto for 10 seconds is measured by the following method.

By using a microammeter (R8430A manufactured by ADVANTEST CORPORATION) as a resistance meter and a UR probe (manufactured by Mitsubishi Chemical Analytech Co., Ltd.) as a probe, the volume resistivity (log Ω·cm) is measured at a total of 18 spots in the intermediate transfer belt, 6 spots at equal intervals in the circumferential direction and 3 spots in the central portions and both end portions in the width direction, at a voltage of 500 V under a pressure of 1 kgf for a voltage application time of 10 seconds, and the average thereof is calculated. The volume resistivity is measured in an environment of a temperature of 22° C. and a humidity of 55% RH.

Surface Resistivity of Intermediate Transfer Belt

From the viewpoint of transferability to embossed paper, the common logarithm of the surface resistivity that the intermediate transfer belt has in a case where a voltage of 500 V is applied to the outer peripheral surface thereof for 10 seconds is, for example, preferably 10.0 (log Ω/suq.) or more 15.0 (log Ω/suq.) or less, more preferably 10.5 (log Ω/suq.) or more and 14.0 (log Ω/suq.) or less, and particularly preferably 11.0 (log Ω/suq.) or more and 13.5 (log Ω/suq.) or less.

The unit of the surface resistivity, log Ω/suq, expresses the surface resistivity in a logarithm of resistance per unit area, which is also written as log Ω/suq.), Log Ω/suquare, log Ω/□, or the like.

The surface resistivity that the intermediate transfer belt has in a case where a voltage of 500 V is applied to the outer peripheral surface thereof for 10 seconds is measured by the following method.

By using a microammeter (R8430A manufactured by ADVANTEST CORPORATION) as a resistance meter and a UR probe (manufactured by Mitsubishi Chemical Analytech Co., Ltd.) as a probe, the surface resistivity (log Ω/suq.) of the outer peripheral surface of the intermediate transfer belt is measured at a total of 18 spots within the outer peripheral surface of the intermediate transfer belt, 6 spots at equal intervals in the circumferential direction and 3 spots in the central portions and both end portions in the width direction, at a voltage of 500 V under a pressure of 1 kgf for a voltage application time of 10 seconds, and the average thereof is calculated. The volume resistivity is measured in an environment of a temperature of 22° C. and a humidity of 55% RH.

Manufacturing Method of Intermediate Transfer Belt

The intermediate transfer belt is obtained using a known manufacturing method of an intermediate transfer belt.

Examples of the method of applying the metal oxide particles to the surface of the intermediate transfer belt include the following aspects (1), (2), and (3). Among these, for example, the aspect (1) is preferable.

(1) Aspect in which a supply member is brought into contact with a molded product of metal oxide particles to scrape off the metal oxide particles, and the scraped metal oxide particles are supplied to a surface of a belt body.

(2) Aspect in which a molded product of metal oxide particles is directly pressed on an intermediate transfer belt, such that the molded product is worn away to supply the metal oxide particles to a surface of an intermediate transfer belt.

(3) Aspect in which an appropriate amount of powdery metal oxide particles are placed on a supply member such as a roll and supplied to a surface of an intermediate transfer belt from the supply member.

Configuration of Transfer Device

First Exemplary Embodiment

The transfer device according to a first exemplary embodiment is a transfer device including an intermediate transfer belt that has a surface to which a toner image is to be transferred and solid lubricant particles which are attached to the surface, a primary transfer device that has a primary transfer member performing primary transfer of a toner image formed on a surface of an image holder to the surface of the intermediate transfer belt, a secondary transfer device that has a secondary transfer member which is arranged in contact with the surface of the intermediate transfer belt and performs secondary transfer of the toner image transferred to the surface of the intermediate transfer belt to a surface of a recording medium, and a detection device that detects a density of the toner image transferred to the surface of the intermediate transfer belt and has a light irradiation unit irradiating the surface of the intermediate transfer belt with light and a light receiving unit receiving reflected light generated in a case where the light radiated from the light irradiation unit is reflected from the surface of the intermediate transfer belt.

The transfer device according to the first exemplary embodiment may include a cleaning device that has a cleaning blade cleaning the surface of the intermediate transfer belt.

In the primary transfer device, the primary transfer member is arranged to face the image holder across the intermediate transfer belt. In the primary transfer device, by the primary transfer member, a voltage with polarity opposite to charging polarity of a toner is applied to the intermediate transfer belt, such that primary transfer of a toner image to the surface of the intermediate transfer belt is performed.

In the secondary transfer device, the secondary transfer member is arranged on a toner image-holding side of the intermediate transfer belt. The secondary transfer device includes, for example, a secondary transfer member and a back surface member that is arranged on the side opposite to the toner image-holding side of the intermediate transfer belt. In the secondary transfer device, the intermediate transfer belt and the recording medium are interposed between the secondary transfer member and the back surface member, and a transfer electric field is formed. In this way, secondary transfer of the toner image formed on the intermediate transfer belt to the recording medium is performed.

The secondary transfer member may be a secondary transfer roll or a secondary transfer belt. As the back surface member, for example, a back roll is used.

The detection device is arranged, for example, on the intermediate transfer belt, on the downstream side of the image holder in the rotation direction of the intermediate transfer belt.

As the detection device, for example, a device employing a known method is adopted, the device irradiating the surface of the intermediate transfer belt with light and detecting the toner density by using the fact that the reflectance of the light varies with the toner density.

In the detection device, the irradiation unit is configured, for example, with a known light emitting element such as a light emitting diode (LED). The light receiving unit is configured, for example, with a known light receiving element such as a phototransistor or a Si photodiode.

In the cleaning device, the cleaning blade is arranged on a toner image-holding side of the intermediate transfer belt. The cleaning device includes, for example, the cleaning blade and a back surface member that is arranged on the side opposite to the toner image-holding side of the intermediate transfer belt. In the cleaning device, for example, in a state where the intermediate transfer belt is interposed between the cleaning blade and the back surface member, the cleaning blade cleans the surface of the intermediate transfer belt.

The transfer device according to the present exemplary embodiment may be a transfer device that transfers a toner image to the surface of a recording medium via a plurality of intermediate transfer belts. That is, the transfer device may be, for example, a transfer device of performing primary transfer of a toner image to a first intermediate transfer belt from an image holder, performing secondary transfer of the toner image to a second intermediate transfer belt from the first intermediate transfer belt, and then performing tertiary transfer of the toner image to a recording medium from the second intermediate transfer belt.

As at least one of the plurality of intermediate transfer belts of the transfer device, the intermediate transfer belt according to the present exemplary embodiment is used.

Second Exemplary Embodiment

The transfer device according to a second exemplary embodiment is a transfer device including an intermediate transfer belt that has a surface to which a toner image is to be transferred and solid lubricant particles which are attached to the surface, a primary transfer device that has a primary transfer member performing primary transfer of a toner image formed on a surface of an image holder to the surface of the intermediate transfer belt, a secondary transfer device that has a secondary transfer member which is arranged in contact with the surface of the intermediate transfer belt and performs secondary transfer of the toner image transferred to the surface of the intermediate transfer belt to a surface of a recording medium, a detection device that detects a density of the toner image transferred to the surface of the intermediate transfer belt and has a light irradiation unit irradiating the surface of the intermediate transfer belt with light and a light receiving unit receiving reflected light generated in a case where the light radiated from the light irradiation unit is reflected from the surface of the intermediate transfer belt, and a solid lubricant particle supply device that is provided in contact with the surface of the intermediate transfer belt and supplies solid lubricant particles to the surface of the intermediate transfer belt.

That is, the transfer device according to the second exemplary embodiment is the transfer device according to the first exemplary embodiment that includes the solid lubricant particle supply device.

The transfer device according to the second exemplary embodiment may also include a cleaning device that has a cleaning blade cleaning the surface of the intermediate transfer belt.

In the transfer device according to the second exemplary embodiment, the solid lubricant particle supply device is provided, for example, on the downstream side of the secondary transfer device in the rotation direction of the intermediate transfer belt and on the upstream side of the cleaning device in the rotation direction of the intermediate transfer belt.

For example, in an aspect, the solid lubricant particle supply device has a molded product of solid lubricant particles and a solid lubricant particle supply member (the aforementioned aspect (1)).

Examples of the molded product of solid lubricant particles include solid lubricant particles solidified together with a binder resin in a solid state, and a molded product obtained by performing compression molding on solid lubricant particles, and the like. The shape of the molded product includes a rod shape, a plate shape (that is, a blade shape), and the like.

Examples of the solid lubricant particle supply member include a rotary brush, a rubber roll, and the like. Among these, a rotary brush is preferable. While rotating, the rotary brush and the rubber roll come into contact with a molded product of solid lubricant particles to scrape off the solid lubricant particles and supply the scraped solid lubricant particles to the surface of the intermediate transfer belt.

For example, in another aspect, the solid lubricant particle supply device directly presses the intermediate transfer belt on the molded product of solid lubricant particles (the aforementioned aspect (2)). As a result of wear of the molded product of solid lubricant particles pressed on the intermediate transfer belt, the solid lubricant particles are supplied to the surface of the intermediate transfer belt.

The configuration of the transfer device according to the second exemplary embodiment is the same as the configuration of the transfer device according to the first exemplary embodiment, except for the solid lubricant particle supply device.

Image Forming Apparatus

The image forming apparatus according to the present exemplary embodiment includes a toner image forming device that forms a toner image on a surface of an image holder and a transfer device that transfers the toner image formed on the surface of the image holder to a surface of a recording medium. As the transfer device, the transfer device according to the first exemplary embodiment or the transfer device according to the second exemplary embodiment is used.

Examples of the toner image forming device include a device including an image holder, a charging device that charges the surface of the image holder, an electrostatic latent image forming device that forms an electrostatic latent image on the surface of the charged image holder, and a developing device that develops the electrostatic latent image formed on the surface of the image holder with a developer containing a toner to form a toner image.

As the image forming apparatus according to the present exemplary embodiment, known image forming apparatuses are used which include an apparatus including a fixing unit that fixes a toner image transferred to the surface of a recording medium; an apparatus including a cleaning unit that cleans the surface of an image holder not yet being charged after transfer of a toner image; an apparatus including an electricity removing unit that removes electricity by irradiating the surface of an image holder, the image holder not yet being charged, with electricity removing light after transfer of a toner image; an apparatus including an image holder heating member that raises the temperature of an image holder to reduce relative temperature, and the like.

The image forming apparatus according to the present exemplary embodiment may be either an image forming apparatus for a dry developing method or an image forming apparatus for a wet developing method (developing method using a liquid developer).

In the image forming apparatus according to the present exemplary embodiment, for example, a portion including the image holder may be a cartridge structure (process cartridge) detachable from the image forming apparatus. As the process cartridge, for example, a process cartridge including a toner image forming device and a transfer device is preferably used.

Hereinafter, an example of the image forming apparatus according to the present exemplary embodiment will be described with reference to drawings. Here, the image forming apparatus according to the present exemplary embodiment is not limited thereto. Hereinafter, among the parts shown in the drawing, main parts will be described, and others will not be described.

The example of the image forming apparatus to be described with reference to drawings is an image forming apparatus that uses the transfer device according to the second exemplary embodiment as a transfer device. In the image forming apparatus that uses the transfer device according to the first exemplary embodiment as a transfer device, a solid lubricant supply device may or may not be provided in the transfer device.

Image Forming Apparatus

FIG. 1 is a schematic configuration view showing the configuration of the image forming apparatus according to the present exemplary embodiment.

As shown in FIG. 1, an image forming apparatus 100 according to the present exemplary embodiment is, for example, an intermediate transfer-type image forming apparatus that is generally called a tandem type, and includes a plurality of image forming units 1Y, 1M, 1C, and 1K (an example of a toner image forming device) in which a toner image of each color component is formed by an electrophotographic method, a primary transfer portion 10 that performs sequential transfer (primary transfer) of the toner image of each color component formed by each of the image forming units 1Y, 1M, 1C, and 1K to an intermediate transfer belt 15, a secondary transfer portion 20 that performs batch transfer (secondary transfer) of the overlapped toner images transferred to the intermediate transfer belt 15 to paper K as a recording medium, and a fixing device 60 that fixes the images transferred by the secondary transfer on the paper K. The image forming apparatus 100 also has a control portion 40 that controls the operation of each device (each portion).

Each of the image forming units 1Y, 1M, 1C, and 1K of the image forming apparatus 100 includes a photoreceptor 11 (an example of an image holder) that holds the toner image formed on the surface thereof and rotates in the direction of an arrow A.

As an example of a charging unit, a charger 12 for charging the photoreceptor 11 is provided around the photoreceptor 11. As an example of a latent image forming unit, a laser exposure machine 13 that draws an electrostatic latent image on the photoreceptor 11 is provided (in FIG. 1, an exposure beam is represented by a mark Bm).

Around the photoreceptor 11, as an example of a developing unit, there are provided a developing machine 14 that contains toners of each color component and makes the electrostatic latent image on the photoreceptor 11 into a visible image by using the toners and a primary transfer roll 16 that transfers toner images of each color component formed on the photoreceptor 11 to the intermediate transfer belt 15 by the primary transfer portion 10.

Around the photoreceptor 11, there are provided a photoreceptor cleaner 17 that removes the residual toner on the photoreceptor 11 and devices for electrophotography, such as the charger 12, the laser exposure machine 13, the developing machine 14, the primary transfer roll 16, and the photoreceptor cleaner 17, that are arranged in sequence along the rotation direction of the photoreceptor 11. These image forming units 1Y, 1M, 1C, and 1K are substantially linearly arranged in order of yellow (Y), magenta (M), cyan (C), and black (K) from the upstream side of the intermediate transfer belt 15.

By various rolls, the intermediate transfer belt 15 is driven to circulate (rotate) in a direction B shown in FIG. 1 at a speed fit for the purpose. The image forming apparatus 100 has, as the various rolls, a driving roll 31 that is driven by a motor (not shown in the drawing) excellent in maintaining a constant speed and rotates the intermediate transfer belt 15, a supporting roll 32 that supports the intermediate transfer belt 15 substantially linearly extending along the arrangement direction of the photoreceptors 11, a tension applying roll 33 that applies tension to the intermediate transfer belt 15 and functions as a correcting roll preventing meandering of the intermediate transfer belt 15, a back roll 25 that is provided in the secondary transfer portion 20, and a back roll 34 for cleaning that is provided in a cleaning portion scrapping off the residual toner on the intermediate transfer belt 15.

The primary transfer portion 10 is configured with the primary transfer roll 16 that is arranged to face the photoreceptor 11 across the intermediate transfer belt 15. The primary transfer roll 16 is arranged to be pressed on the photoreceptor 11 across the intermediate transfer belt 15, and the polarity of voltage (primary transfer bias) applied to the primary transfer roll 16 is opposite to the charging polarity (negative polarity, the same shall apply hereinafter) of the toner. As a result, the toner image on each photoreceptor 11 is sequentially electrostatically sucked onto the intermediate transfer belt 15, which leads to the formation of overlapped toner images on the intermediate transfer belt 15.

The secondary transfer portion 20 includes the back roll 25 and a secondary transfer roll 22 that is arranged on a toner image-holding surface side of the intermediate transfer belt 15.

The back roll 25 is formed such that the surface resistivity thereof is $1\times10^{7}\Omega/\square$ or more and $1\times10^{10}\Omega/\square$ or less. The hardness of the back roll 25 is set to, for example, 70° (ASKER C: manufactured by KOBUNSHI KEIKI CO., LTD., the same shall apply hereinafter). The back roll 25 is arranged on the back surface side of the intermediate transfer belt 15 to configure a counter electrode of the secondary transfer roll 22. A power supply roll 26 made of a metal to which secondary transfer bias is stably applied is arranged to come into contact with the back roll 25.

On the other hand, the secondary transfer roll 22 is a cylindrical roll having a volume resistivity of $10^{7.5}$ Ωcm or more and $10^{8.5}$ Ωcm or less. The secondary transfer roll 22 is arranged to be pressed on the back roll 25 across the intermediate transfer belt 15. The secondary transfer roll 22 is grounded such that the secondary transfer bias is formed between the secondary transfer roll 22 and the back roll 25, which induces secondary transfer of the toner image onto the paper K transported to the secondary transfer portion 20.

On the downstream side of the secondary transfer portion 20 of the intermediate transfer belt 15, an intermediate transfer belt-cleaning member 35 separable from the intermediate transfer belt 15 is provided which removes the residual toner or paper powder on the intermediate transfer belt 15 remaining after the secondary transfer and cleans the surface of the intermediate transfer belt 15. Examples of the intermediate transfer belt-cleaning member 35 include a cleaning roll. The intermediate transfer belt-cleaning member 35 may be a cleaning blade.

On the downstream side of the secondary transfer portion 20 of the secondary transfer roll 22, a secondary transfer roll-cleaning member 22A is provided which removes the residual toner or paper powder on the secondary transfer roll 22 remaining after the secondary transfer and cleans the surface of the secondary transfer roll 22. Examples of the secondary transfer roll-cleaning member 22A include a cleaning blade. The secondary transfer roll-cleaning member 22A may be a cleaning roll.

A solid lubricant particle supply device 70 that supplies metal oxide particles as a solid lubricant is provided on the downstream side of the secondary transfer portion 20 and the upstream side of the intermediate transfer belt-cleaning member 35 of the intermediate transfer belt 15.

The solid lubricant particle supply device 70 has a molded product 71 of metal oxide particles, a solid lubricant particle supply member 72 that scrapes off the molded product of metal oxide particles to supply metal oxide particles to the surface of the intermediate transfer belt 15, and a sliding member 73 that slides to rub the metal oxide particles against the surface of the intermediate transfer belt 15 and form a coating of the metal oxide particles.

The configuration including the intermediate transfer belt 15, the primary transfer roll 16, the secondary transfer roll 22, the intermediate transfer belt-cleaning member 35, and the solid lubricant particle supply device 70 corresponds to an example of the transfer device.

Figure 2:
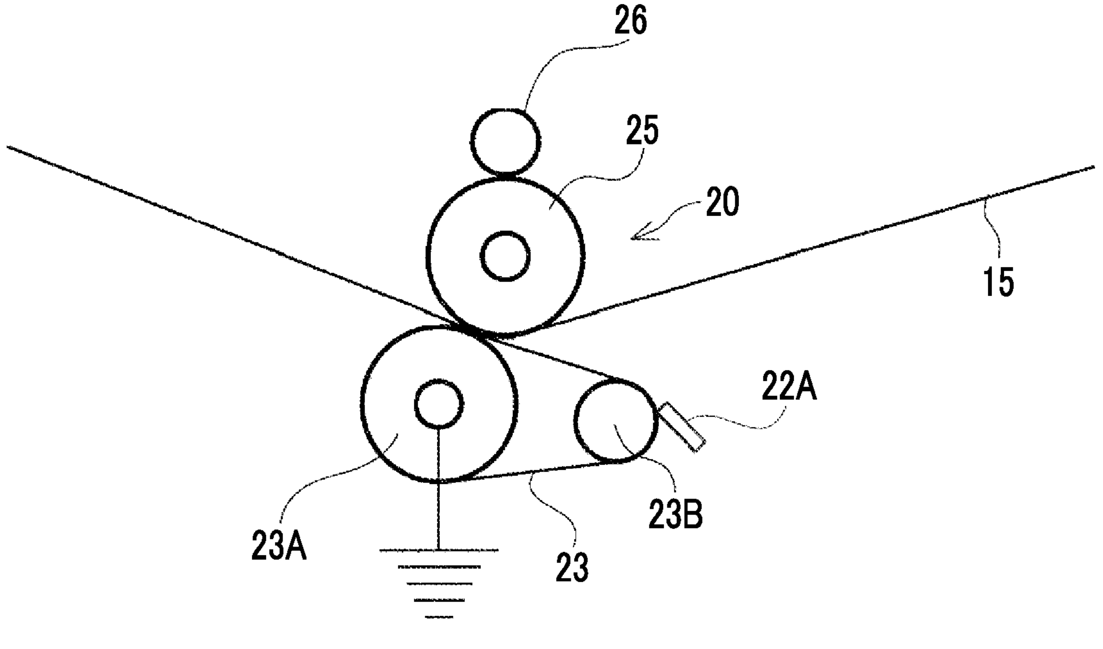
FIG. 2 is a schematic configuration view showing the periphery of a secondary transfer portion in another example of the image forming apparatus according to the present exemplary embodiment.

The image forming apparatus 100 may have a configuration in which the apparatus includes a secondary transfer belt (an example of a secondary transfer member) instead of the secondary transfer roll 22. Specifically, as shown in FIG. 2, the image forming apparatus 100 may include a secondary transfer device including a secondary transfer belt 23, a driving roll 23A that is disposed to face the back roll 25 via the secondary transfer belt 23 and the intermediate transfer belt 15, and an idler roll 23B that allows the secondary transfer belt 23 to be stretched thereon in cooperation with the driving roll 23A.

On the other hand, on the upstream side of the yellow image forming unit 1Y, a reference sensor (home position sensor) 42 is arranged which generates a reference signal to be a reference for taking the image forming timing in each of the image forming units 1Y, 1M, 1C, and 1K. On the downstream side of the black image forming unit 1K, a toner density detection sensor 43 (an example of a detection device) is arranged.

The reference sensor 42 recognizes a mark provided on the back side of the intermediate transfer belt 15 and generates a reference signal. Each of the image forming units 1Y, 1M, 1C, and 1K is configured such that these units start to form images according to the instruction from the control portion 40 based on the recognition of the reference signal.

The toner density detection device 43 includes an LED sensor 43A (an example of a irradiation unit) and a light receiving sensor 43B (an example of a light receiving unit). The toner density detection device 43 irradiates the surface of the intermediate transfer belt 15 with light from the LED sensor 43A, and receives the reflected light of the light by the light receiving sensor 43B. Then, the control portion 40 obtains the toner density based on the difference in the reflectance of received light, and controls the image forming apparatus to achieve the target toner density.

The image forming apparatus according to the present exemplary embodiment includes, as a transport unit for transporting the paper K, a paper storage portion 50 that stores the paper K, a paper feeding roll 51 that takes out and transports the paper K stacked in the paper storage portion 50 at a predetermined timing, a transport roll 52 that transports the paper K transported by the paper feeding roll 51, a transport guide 53 that sends the paper K transported by the transport roll 52 to the secondary transfer portion 20, a transport belt 55 that transports the paper K transported after going through secondary transfer by the secondary transfer roll 22 to the fixing device 60, and a fixing entrance guide 56 that guides the paper K to the fixing device 60.

Next, the basic image forming process of the image forming apparatus according to the present exemplary embodiment will be described.

In the image forming apparatus according to the present exemplary embodiment, image data output from an image reading device not shown in the drawing, a personal computer (PC) not shown in the drawing, or the like is subjected to image processing by an image processing device not shown in the drawing, and then the image forming units 1Y, 1M, 1C, and 1K perform the image forming operation.

In the image processing device, image processing, such as shading correction, misregistration correction, brightness/color space conversion, gamma correction, or various image editing works such as frame erasing or color editing and movement editing, is performed on the input image data. The image data that has undergone the image processing is converted into color material gradation data of 4 colors, Y, M, C, and K, and is output to the laser exposure machine 13.

In the laser exposure machine 13, according to the input color material gradation data, for example, the photoreceptor 11 of each of the image forming units 1Y, 1M, 1C, and 1K is irradiated with the exposure beam Bm emitted from a semiconductor laser. The surface of each of the photoreceptors 11 of the image forming units 1Y, 1M, 1C, and 1K is charged by the charger 12 and then scanned and exposed by the laser exposure machine 13. In this way, an electrostatic latent image is formed. By each of the image forming units 1Y, 1M, 1C, and 1K, the formed electrostatic latent image is developed as a toner image of each of the colors Y, M, C, and K.

In the primary transfer portion 10 where each photoreceptor 11 and the intermediate transfer belt 15 come into contact with each other, the toner images formed on the photoreceptors 11 of the image forming units 1Y, 1M, 1C, and 1K are transferred onto the intermediate transfer belt 15. More specifically, in the primary transfer portion 10, by the primary transfer roll 16, a voltage (primary transfer bias) with a polarity opposite to the polarity of the charging polarity (negative polarity) of the toner is applied to the substrate of the intermediate transfer belt 15, and the toner images are sequentially overlapped on the surface of the intermediate transfer belt 15 and subjected to primary transfer.

After the primary transfer by which the toner images are sequentially transferred to the surface of the intermediate transfer belt 15, the intermediate transfer belt 15 moves, and the toner images are transported to the secondary transfer portion 20. In a case where the toner images are transported to the secondary transfer portion 20, in the transport unit, the paper feeding roll 51 rotates in accordance with the timing at which the toner images are transported to the secondary transfer portion 20, and the paper K having the target size is fed from the paper storage portion 50. The paper K fed from the paper feeding roll 51 is transported by the transport roll 52, passes through the transport guide 53, and reaches the secondary transfer portion 20. Before reaching the secondary transfer portion 20, the paper K is temporarily stopped, and a positioning roll (not shown in the drawing) rotates according to the movement timing of the intermediate transfer belt 15 holding the toner images, such that the position of the paper K is aligned with the position of the toner images.

In the secondary transfer portion 20, via the intermediate transfer belt 15, the secondary transfer roll 22 is pressed on the back roll 25. At this time, the paper K transported at the right timing is interposed between the intermediate transfer belt 15 and the secondary transfer roll 22. At this time, in a case where a voltage (secondary transfer bias) with the same polarity as the charging polarity (negative polarity) of the toner is applied from the power supply roll 26, a transfer electric field is formed between the secondary transfer roll 22 and the back roll 25. In the secondary transfer portion 20 pressed by the secondary transfer roll 22 and the back roll 25, the unfixed toner images held on the intermediate transfer belt 15 are electrostatically transferred onto the paper K in a batch.

Thereafter, the paper K to which the toner images are electrostatically transferred is transported in a state of being peeled off from the intermediate transfer belt 15 by the secondary transfer roll 22, and is transported to the transport belt 55 provided on the downstream side of the secondary transfer roll 22 in the paper transport direction. The transport belt 55 transports the paper K to the fixing device 60 according to the optimum transport speed in the fixing device 60. The unfixed toner images on the paper K transported to the fixing device 60 are fixed on the paper K by being subjected to a fixing treatment by heat and pressure by the fixing device 60. Then, the paper K on which a fixed image is formed is transported to an ejected paper-storing portion (not shown in the drawing) provided in an ejection portion of the image forming apparatus.

Meanwhile, after the transfer to the paper K is finished, the residual toner remaining on the intermediate transfer belt 15 is transported to the cleaning portion as the intermediate transfer belt 15 rotates, and is removed from the intermediate transfer belt 15 by the back roll 34 for cleaning and the intermediate transfer belt-cleaning member 35.

Hitherto, the present exemplary embodiment has been described. However, the present exemplary embodiment is not limited to the above exemplary embodiments, and various modifications, changes, and ameliorations can be added thereto.

EXAMPLES

Examples of the present invention will be described below, but the present invention is not limited to the following examples. In the following description, unless otherwise specified, "parts" and "%" are based on mass in all cases.

Examples 1 to 16 and Comparative Examples 1 to 3

An intermediate transfer belt is prepared is for an intermediate transfer-type image forming apparatus ("Revoria Press PC1120" from FUJIFILM Business Innovation Corp.) including a detection device detecting a toner density on the intermediate transfer belt.

Under the conditions shown in Table 1, solid lubricant particles are attached to the surface of the intermediate transfer belt.

The surface of the intermediate transfer belt, to which the solid lubricant particles are attached, is irradiated with light from an LED sensor under the conditions shown in Table 1, the light reflected from the surface of the intermediate transfer belt is received by a light receiving sensor, and the reflectance is determined.

The following conditions are changed to determine the reflectance of each example.

Volume-average particle size A of solid lubricant particles

Coverage of surface of intermediate transfer belt by solid lubricant particles

Refractive index of solid lubricant particles

Volume-based particle size distribution index GSDv of solid lubricant particles

Wavelength B of light emitted from LED sensor

The types of solid lubricant particles used in each example are abbreviated as follows.

Silica particles 1: "TG-5110" manufactured by Cabot Corporation

Silica particles 2: "TG-C390" manufactured by Cabot Corporation

Silica particles 3: "TG-C110" manufactured by Cabot Corporation

Silica particles 4: "TG-811F" manufactured by Cabot Corporation

Silica particles 5: "TG-C6020N" manufactured by Cabot Corporation

Strontium titanate particles 1: "Strontium titanate, 99+%" manufactured by Fujifilm Wako Pure Chemical Corporation Evaluation of Actual Device In the same settings as in each example, the intermediate transfer belt having solid lubricant particles attached to the surface thereof is incorporated into an intermediate transfer-type image forming apparatus ("Revoria Press PC1120" from FUJIFILM Business Innovation Corp.) including a detection device detecting a toner density on the intermediate transfer belt, and the transfer sustainability is evaluated as below.

Transfer Sustainability

A halftone cyan image having an image density of 30% is printed on 1,000 sheets of embossed paper (BOSSYUKI), and filling of recesses is visually observed at the initial stage (a period during which the image is formed on 10 sheets) and visually observed over time (period during which the image is formed on 1,000 sheets, sustainability). By the comparison between the first image and the 10th image and between the first image and the 1,000th image, the sustainability is evaluated. The evaluation standard is as follows.

A+: Just as the first image, color omission of recesses does not occur.

A: There is no change from the first image, and slight color omission of recesses is observed.

B: Color omission of recesses is slightly worse than the first image.

C: Color omission of recesses is more serious than B, compared with the first image and is not acceptable.

D: Color omission of recesses is much more serious than C, compared with the first image.

of the intermediate transfer belt and performs secondary transfer of the toner image transferred to the surface of the intermediate transfer belt to a surface of a recording medium, and a detection device that detects a density of the toner image transferred to the surface of the intermediate transfer belt and has a light irradiation unit irradiating the surface of the intermediate transfer belt with light and a light receiving unit receiving reflected light generated in a case where the light radiated from the light

TABLE 1

| | Solid lubricant particles | | | | | LED sensor | | | | |
|---|---|---|---|---|---|---|---|---|---|---|
| | Type — | Particle size A nm | Refractive index — | GSDv — | Coverage % | Wavelength B of light nm | A × 8.6 + 400 | A × 8.6 + 300 | Reflectance % | Transfer sustainability — |
| Example 1 | Silica particles 1 | 34 | 1.5 | 2.5 | 40 | 700 | 916 | 592.4 | 70 | A |
| Example 2 | | | | | | 940 | 916 | 592.4 | 80 | A |
| Example 3 | | | | | | 1400 | 916 | 592.4 | 90 | A |
| Example 4 | | | | | | 2000 | 916 | 592.4 | 90 | A |
| Comparative Example 1 | Silica particles 2 | 60 | 1.5 | 2.8 | 40 | 700 | 916 | 816.0 | 60 | A+ |
| Example 5 | | | | | | 940 | 916 | 816.0 | 75 | A+ |
| Example 6 | | | | | | 1400 | 916 | 816.0 | 80 | A+ |
| Example 7 | | | | | | 2000 | 916 | 816.0 | 90 | A+ |
| Comparative Example 2 | Silica particles 3 | 115 | 1.5 | 3 | 40 | 700 | 1489 | 1289.0 | 40 | A |
| Comparative Example 3 | | | | | | 940 | 1489 | 1289.0 | 50 | A |
| Example 8 | | | | | | 1400 | 1489 | 1289.0 | 70 | A |
| Example 9 | | | | | | 2000 | 1489 | 1289.0 | 90 | A |
| Example 10 | Silica particles 2 | 60 | 1.5 | 2.8 | 28 | 940 | 1016 | 816 | 75 | A |
| Example 11 | Silica particles 2 | 60 | 1.5 | 2.8 | 85 | 940 | 1016 | 816 | 75 | A |
| Example 12 | Silica particles 4 | 12 | 1.5 | 2.2 | 40 | 940 | 503.2 | 403.2 | 90 | B |
| Example 13 | Silica particles 5 | 180 | 1.5 | 3.2 | 40 | 2000 | 1948 | 1848 | 70 | B |
| Example 14 | Silica particles 4 | 12 | 1.5 | 3.2 | 40 | 600 | 503.2 | 403.2 | 70 | B |
| Example 15 | Silica particles 5 | 180 | 1.5 | 3.2 | 40 | 2000 | 1948 | 1848 | 70 | B |
| Example 16 | Strontium titanate particles 1 | 50 | 2.4 | 3 | 40 | 1050 | 830 | 730 | 70 | B |

The above results tell that the decrease in the reflectance of light reflected from the surface of the intermediate transfer belt is further suppressed in the present examples than in comparative examples, in a case where the surface of the intermediate transfer belt is irradiated with light from the LED sensor.

The above result tells that an image having a target image density is more effectively obtained in the present examples than in comparative examples.

The present exemplary embodiment includes the following aspects.

(((1)))

A transfer device comprising:

an intermediate transfer belt that has a surface to which a toner image is to be transferred and solid lubricant particles are attached;

a primary transfer device that has a primary transfer member performing primary transfer of a toner image formed on a surface of an image holder to the surface of the intermediate transfer belt;

a secondary transfer device that has a secondary transfer member which is arranged in contact with the surface irradiation unit is reflected from the surface of the intermediate transfer belt, wherein a relationship between a volume-average particle size A (nm) of the solid lubricant particles attached to the surface of the intermediate transfer belt and a wavelength B (nm) of the light radiated from the light irradiation unit satisfies the following Expression 1.

$$B > A \times 8.6 + 300 \quad \text{Expression 1}$$

(((2)))

The transfer device according to (((1))), wherein the relationship between the volume-average particle size A (nm) of the solid lubricant particles and the wavelength B (nm) of the light radiated from the light irradiation unit satisfies the following Expression 2.

$$B > A \times 8.6 + 400 \quad \text{Expression 2}$$

(((3)))

The transfer device according to (((1))) or (((2))), wherein a coverage of the surface of the intermediate transfer belt by the solid lubricant particles is 25% or more and 90% or less.

(((4)))

The transfer device according to any one of (((1))) to (((3))), wherein the volume-average particle size A (nm) of the solid lubricant particles is 25 nm or more and 200 nm or less.

(((5)))

The transfer device according to any one of (((1))) to (((4))), wherein the wavelength B (nm) of the light radiated from the light irradiation unit is 600 nm or more and 2,000 nm or less.

(((6)))

The transfer device according to any one of (((1))) to ((5)

wherein a refractive index of the solid lubricant particles is 1.2 or more and 2.5 or less.

(((7)))

The transfer device according to any one of (((1))) to (((6))), a volume-based particle size distribution index GSDv of the solid lubricant particles is 3.5 or less.

(((8)))

The transfer device according to any one of (((1))) to (((7))), wherein a coverage of the surface of the intermediate transfer belt by the solid lubricant particles is 25% or more and 90% or less, the volume-average particle size A (nm) of the solid lubricant particles is 25 nm or more and 200 nm or less, the wavelength B (nm) of the light radiated from the light irradiation unit is 600 nm or more and 2,000 nm or less, a refractive index of the solid lubricant particles is 1.2 or more and 2.5 or less, and a volume-based particle size distribution index GSDv of the solid lubricant particles is 3.5 or less.

(((9)))

An image forming apparatus comprising:

a toner image forming device that has an image holder and forms a toner image on a surface of the image holder; and the transfer device according to any one of (((1))) to (((8))) that is a transfer device transferring the toner image formed on the surface of the image holder to a surface of a recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A transfer device comprising:

an intermediate transfer belt comprising a surface to which a toner image may be transferred and to which solid lubricant particles are attached;

a primary transfer device comprising a primary transfer member configured to perform primary transfer of a toner image formed on a surface of an image holder to the surface of the intermediate transfer belt;

a secondary transfer device comprising a secondary transfer member which contacts the surface of the intermediate transfer belt and which is configured to perform secondary transfer of the toner image transferred to the surface of the intermediate transfer belt to a surface of a recording medium; and a detection device configured to detect a density of the toner image transferred to the surface of the intermediate transfer belt and which comprises:

a light irradiation unit configured to irradiate the surface of the intermediate transfer belt with light; and a light receiving unit configured to receive reflected light generated in a case where the light radiated from the light irradiation unit is reflected from the surface of the intermediate transfer belt, wherein a relationship between a volume-average particle size A (nm) of the solid lubricant particles attached to the surface of the intermediate transfer belt and a wavelength B (nm) of the light radiated from the light irradiation unit satisfies the following Expression 1:

$$B > A \times 8.6 + 300. \qquad \text{Expression 1}$$

2. The transfer device according to claim 1, wherein the relationship between the volume-average particle size A (nm) of the solid lubricant particles and the wavelength B (nm) of the light radiated from the light irradiation unit satisfies the following Expression 2:

$$B > A \times 8.6 + 400. \qquad \text{Expression 2}$$

3. An image forming apparatus comprising:

a toner image forming device comprising an image holder and configured to form a toner image on a surface of the image holder; and the transfer device according to claim 2 that is a transfer device configured to transfer the toner image formed on the surface of the image holder to a surface of a recording medium.

4. The transfer device according to claim 1, wherein a coverage of the surface of the intermediate transfer belt by the solid lubricant particles is 25% or more and 90% or less.

5. An image forming apparatus comprising:

a toner image forming device comprising an image holder and configured to form a toner image on a surface of the image holder; and the transfer device according to claim 4 that is a transfer device configured to transfer the toner image formed on the surface of the image holder to a surface of a recording medium.

6. The transfer device according to claim 1, wherein the volume-average particle size A (nm) of the solid lubricant particles is 25 nm or more and 200 nm or less.

7. An image forming apparatus comprising:

a toner image forming device comprising an image holder and configured to form a toner image on a surface of the image holder; and the transfer device according to claim 6 that is a transfer device configured to transfer the toner image formed on the surface of the image holder to a surface of a recording medium.

8. The transfer device according to claim 1, wherein the wavelength B (nm) of the light radiated from the light irradiation unit is 600 nm or more and 2,000 nm or less.

9. An image forming apparatus comprising:

a toner image forming device comprising an image holder and configured to form a toner image on a surface of the image holder; and the transfer device according to claim 8 that is a transfer device configured to transfer the toner image formed on the surface of the image holder to a surface of a recording medium.

10. The transfer device according to claim 1, wherein a refractive index of the solid lubricant particles is 1.2 or more and 2.5 or less.

11. An image forming apparatus comprising:

a toner image forming device comprising an image holder and configured to form a toner image on a surface of the image holder; and the transfer device according to claim 10 that is a transfer device configured to transfer the toner image formed on the surface of the image holder to a surface of a recording medium.

12. The transfer device according to claim 1, wherein a volume-based particle size distribution index GSDv of the solid lubricant particles is 3.5 or less.

13. An image forming apparatus comprising:

a toner image forming device comprising an image holder and configured to form a toner image on a surface of the image holder; and the transfer device according to claim 12 that is a transfer device configured to transfer the toner image formed on the surface of the image holder to a surface of a recording medium.

14. The transfer device according to claim 1, wherein a coverage of the surface of the intermediate transfer belt by the solid lubricant particles is 25% or more and 90% or less, wherein the volume-average particle size A (nm) of the solid lubricant particles is 25 nm or more and 200 nm or less, wherein the wavelength B (nm) of the light radiated from the light irradiation unit is 600 nm or more and 2,000 nm or less, wherein a refractive index of the solid lubricant particles is 1.2 or more and 2.5 or less, and wherein a volume-based particle size distribution index GSDv of the solid lubricant particles is 3.5 or less.

15. An image forming apparatus comprising:

a toner image forming device comprising an image holder and configured to form a toner image on a surface of the image holder; and the transfer device according to claim 14 that is a transfer device configured to transfer the toner image formed on the surface of the image holder to a surface of a recording medium.

16. An image forming apparatus comprising:

a toner image forming device comprising an image holder and configured to form a toner image on a surface of the image holder; and the transfer device according to claim 1 that is a transfer device configured to transfer the toner image formed on the surface of the image holder to a surface of a recording medium.

* * * * *